(12) United States Patent
Wegner et al.

(10) Patent No.: US 12,459,523 B2
(45) Date of Patent: Nov. 4, 2025

(54) VEHICLE HAVING CENTER OF GRAVITY LOAD ESTIMATION

(71) Applicant: Ford Global Technologies, LLC, Dearborn, MI (US)

(72) Inventors: Christian Wegner, Grosse Ile, MI (US); Mahmoud Yousef Ghannam, Canton, MI (US); Muhannad Anwar Hamdan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 18/107,091

(22) Filed: Feb. 8, 2023

(65) Prior Publication Data
US 2024/0262374 A1    Aug. 8, 2024

(51) Int. Cl.
*B60W 50/14*     (2020.01)
*B60W 40/13*     (2012.01)
(Continued)

(52) U.S. Cl.
CPC ............ *B60W 50/14* (2013.01); *B60W 40/13* (2013.01); *G06T 7/66* (2017.01); *G06V 20/56* (2022.01); *G06V 20/64* (2022.01); *B60W 2040/1315* (2013.01); *B60W 2050/143* (2013.01); *B60W 2050/146* (2013.01); *B60W 2300/12* (2013.01);
(Continued)

(58) Field of Classification Search
CPC .............. B60W 50/14; B60W 40/13; B60W 2040/1315; B60W 2050/143; B60W 2050/146; B60W 2300/12; B60W 2420/403; B60W 2530/10; G06T 7/66; G06T 2207/30252; G06V 20/56; G06V 20/64
See application file for complete search history.

(56) References Cited

U.S. PATENT DOCUMENTS 3,646,512 A    2/1972    Borgstede
4,108,262 A    8/1978    Anderson
(Continued)

FOREIGN PATENT DOCUMENTS

CN    203819111 U    9/2014

OTHER PUBLICATIONS

Kopier, Michelle, "Ready, Set, Load! A Behind the Scenes Look at Volvo's On-board Weighing System Set to Launch at INTERMAT 2012 in Paris, France" OEM Off-Highway, Mar. 16, 2012, 6 pages.

*Primary Examiner* — Davetta W Goins
*Assistant Examiner* — Sharmin Akhter
(74) *Attorney, Agent, or Firm* — Lorne Forsythe; Price Heneveld LLP

(57) ABSTRACT

A vehicle is provided including a plurality of wheel assemblies, a body supported on the plurality of wheel assemblies and having a cargo area for receiving a cargo load, a load sensing system configured to sense a vehicle load and generate vehicle load signals indicative of the sensed vehicle load, and an object recognition system configured to detect one or more objects in the cargo area and recognize the one or more objects. The vehicle also includes a controller processing the recognized one or more objects and determining dimensions of the cargo load and an estimated center of gravity of cargo load based on the dimensions of the one or more objects in the cargo area, and generates an output indicative of the estimated center of gravity of the cargo load.

13 Claims, 7 Drawing Sheets

(51) Int. Cl.
    *G06T 7/66* (2017.01)
    *G06V 20/56* (2022.01)
    *G06V 20/64* (2022.01)

(52) U.S. Cl.
    CPC ... *B60W 2420/403* (2013.01); *B60W 2530/10* (2013.01); *G06T 2207/30252* (2013.01)

(56) References Cited

U.S. PATENT DOCUMENTS

| | | |
|---|---|---|
| 4,635,739 A | 1/1987 | Foley et al. |
| 4,835,719 A | 5/1989 | Sorrells |
| 4,852,674 A | 8/1989 | Gudat |
| 4,921,578 A | 5/1990 | Shiraishi et al. |
| 4,981,186 A | 1/1991 | Shankle et al. |
| 6,157,889 A | 12/2000 | Baker |
| 7,256,358 B2 | 8/2007 | Kesselman |
| 8,981,918 B2 | 3/2015 | Panse |
| 9,933,294 B1 | 4/2018 | Salter et al. |
| 10,048,113 B2 | 8/2018 | Salter et al. |
| 11,378,440 B2 | 7/2022 | Salter et al. |
| 2001/0009206 A1 | 7/2001 | Lines |
| 2010/0131182 A1 | 5/2010 | Deegan et al. |
| 2014/0054096 A1 | 2/2014 | Carruthers et al. |
| 2017/0113607 A1 | 4/2017 | Corrales Salgado et al. |
| 2018/0170394 A1* | 6/2018 | Bedegi .................. B60T 8/1708 |
| 2020/0247423 A1* | 8/2020 | Almahmoud .......... G01G 19/12 |
| 2022/0155130 A1* | 5/2022 | Laine ................... G01G 19/021 |
| 2022/0301215 A1* | 9/2022 | Detert ....................... G06T 7/73 |
| 2024/0013070 A1* | 1/2024 | Beaurepaire ......... G08G 1/0129 |
| 2024/0034116 A1* | 2/2024 | Coombs ............. B60G 17/0165 |
| 2024/0174499 A1* | 5/2024 | Ignatov ................ B66F 9/0755 |
| 2024/0242514 A1* | 7/2024 | Evans ...................... G06T 7/62 |

\* cited by examiner

VEHICLE HAVING CENTER OF GRAVITY LOAD ESTIMATION

FIELD OF THE DISCLOSURE

The present disclosure generally relates to load carrying vehicles, and more particularly relates to a vehicle configured to estimate the load distribution on the vehicle.

BACKGROUND OF THE DISCLOSURE

Motor vehicles are generally configured to carry a load and typically have load capacities. For example, some vehicles may have a cargo bed for carrying a cargo load in the rear of the vehicle and other vehicles may carry a cargo load within the vehicle or on the roof of the vehicle. It is generally desirable to ensure that the cargo load is manageable. It may be desirable to provide for a load detection system that detects the load distribution on the vehicle.

SUMMARY OF THE DISCLOSURE

According to a first aspect of the present disclosure, a vehicle is provided including a plurality of wheel assemblies, a body supported on the plurality of wheel assemblies and having a cargo area for receiving a cargo load, a load sensing system configured to sense a vehicle load and generate vehicle load signals indicative of the sensed vehicle load, and an object recognition system configured to detect one or more objects in the cargo area and recognize the one or more objects. The vehicle also includes a controller processing the recognized one or more objects and determining dimensions of the cargo load and an estimated center of gravity of the cargo load based on the dimensions of the one or more objects in the cargo area, the controller generating an output indicative of the estimated center of gravity of the cargo load.

Embodiments of the first aspect of the present disclosure can include any one or a combination of the following features:
- the controller estimates the center of gravity of the cargo load using a parallel-axis theorem;
- the controller estimates the center of gravity of the cargo load based on known shapes and sizes of the detected objects in the load area;
- the controller further determines a center of gravity of the vehicle based on the estimated center of gravity of the cargo load;
- the load sensing system comprises a plurality of ride height load sensors;
- the object recognition system comprises one or more imaging devices generating images of the cargo area;
- the generated images are compared to known images of objects to estimate the cargo load;
- the one or more imaging devices are located on the vehicle;
- the one or more imaging devices are located on another vehicle;
- the vehicle comprises a truck having a cargo bed providing the cargo area; and
- the object recognition system comprises one or more cameras located proximate to a CHMSL.

According to a second aspect of the present disclosure, a vehicle is provided and includes a plurality of wheel assemblies, a body supported on the plurality of wheel assemblies and having a cargo area for receiving a cargo load, a load sensing system configured to sense a vehicle load and generate vehicle load signals indicative of the sensed vehicle load, and an object recognition system comprising at least one imaging device configured to capture images of the cargo area and detect one or more objects in the cargo area and to recognize the one or more objects. The vehicle also includes a controller processing the recognized one or more objects and determining an estimated size and distribution of the cargo load and an estimated center of gravity of the cargo load based on sensed dimensions of objects in the cargo area, wherein the controller estimates the center of gravity of the cargo load using a parallel-axis theorem, the controller generating an output indicative of the estimated center of gravity of the cargo load.

According to a third aspect of the present disclosure, a method of estimating a center of gravity of a cargo load on a vehicle is provided. The method includes sensing a vehicle load of the vehicle and generating vehicle load signals indicative of the sensed vehicle load, capturing images of the cargo load in a cargo area of the vehicle with an imaging device, processing the images to determine estimated dimensions of the cargo load, estimating a center of gravity of the cargo load based on the estimated dimensions of the cargo load, and generating an output indicative of the estimated center of gravity of the cargo load.

Embodiments of the third aspect of the present disclosure can include any one or a combination of the following features:
- the step of estimating the center of gravity of the cargo load comprises using a parallel-axis theorem;
- the controller further determines a center of gravity of the vehicle based on the estimated center of gravity of the cargo load;
- the step of capturing images of one or more objects in the cargo area comprises generating images of the load in the cargo area with a camera;
- the step of estimating dimensions of the cargo load comprises comparing images of the cargo area to known images of objects;
- the images are generated with an imaging device located on the vehicle;
- the images are generated with an imaging device located on another vehicle; and
- the step of displaying the output.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
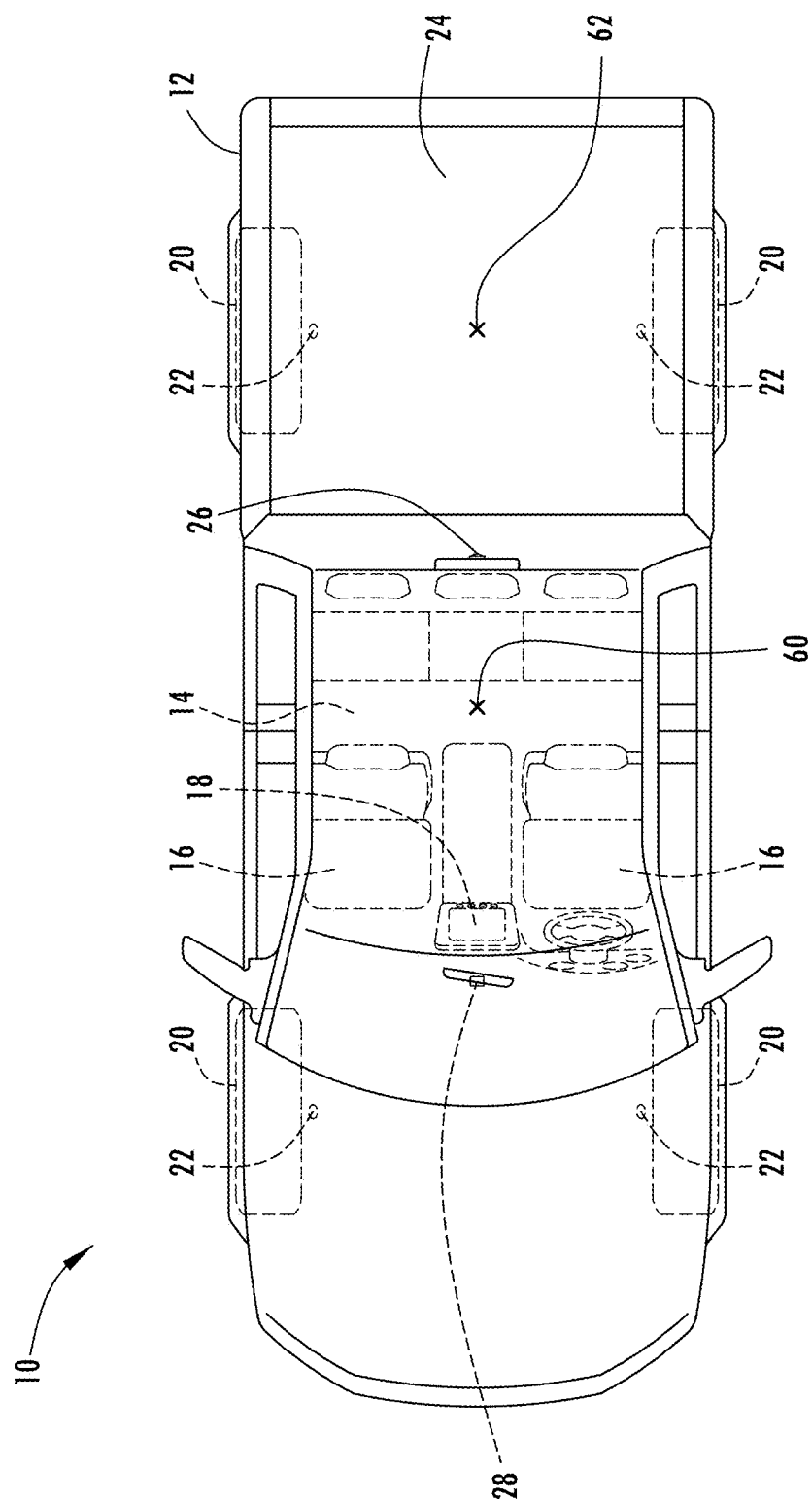
FIG. 1 is a top view of a motor vehicle shown as a pickup truck equipped with a load detection system for estimating a center of gravity of the load, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale, and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a center of gravity load estimator. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating for transporting one or more passengers including a driver of the vehicle 10 and for further transporting a cargo load which may be in the form of one or more items or objects onboard the vehicle 10. The motor vehicle 10 has a vehicle body 12 that generally defines a cabin interior 14. The cabin interior 14 may contain various features and trim components. The cabin interior 14 is shown having an arrangement of seats, such as a front row of passenger seats including first and second seat assemblies 16 each configured to seat a passenger. The motor vehicle 10 shown herein is shown as a pickup truck, for example; however, it should be appreciated that the motor vehicle 10 may otherwise be configured as a van, car, sport utility vehicle (SUV) or other motor vehicle.

The motor vehicle 10 includes a plurality of wheel assemblies 20 which generally support the body, such as via a chassis. Each wheel assembly 20 may include a wheel and a tire, as is commonly known in the art. The motor vehicle 10 has a load sensing system that includes a plurality of ride height load sensors 22 which may be positioned proximate to each of the wheel assemblies 20 to detect height of the vehicle and the corresponding load applied to each of the wheel assemblies 20. It should be appreciated that as the vehicle is loaded at various locations, the ride height load sensors 22 may detect the vehicle load at each wheel assembly which is shown generally at about each of the four locations distributed towards the front and rear and opposite lateral sides of the motor vehicle 10. As such, the distribution of the weight of the motor vehicle 10 and its vehicle load may be determined by measuring the ride height/load sensor signals sensed with the ride height load sensors 22.

The motor vehicle 10, is shown in the form of a truck, such as a pickup truck having a cargo bed 24 located at the rear thereof. The cargo bed 24 generally has upstanding side walls defined within the body 12 that define a cargo space upon which a cargo load, such as one or more objects may be located. As objects are placed within or removed from the cargo bed 24, the load distribution of the cargo load and the vehicle load may change. In the example shown, the motor vehicle 10 has a vehicle center of gravity 60 of the motor vehicle 10. In the unloaded state as shown, the center of gravity 60 of the vehicle 10 remains unchanged. It should be appreciated that the cargo bed 24 may have a cargo load with a center of gravity 62. In FIG. 1, the cargo bed 24 is shown unloaded. As such, the lack of a cargo load within the cargo bed 24 does not change the center of gravity of the vehicle 60 in this scenario.

The motor vehicle 10 further includes an object recognition system which, in the example shown, has a rearward facing imaging device 26 which is shown as a center high mounted stop lamp (CMHSL) camera which is generally provided on the CHMSL on the truck body cab forward and above the cargo bed 24. The rearward facing imaging device 26 is oriented facing vehicle rearward and downward to capture images of the cargo bed 24. As such, the imaging device 26 may capture images of a cargo load placed in the cargo bed 24. The images generated by the imaging device 26 may be processed and identified and used to approximate or estimate the center of gravity of the cargo load. This may be achieved by processing the images with an image processor associated with a controller. In addition, the motor vehicle 10 has a front facing imaging device 28 generally configured and oriented to capture images generally forward of the motor vehicle 10. The front facing imaging device 28 may be a camera located in or proximate to a rearview mirror or other location generally facing forwards of the front side of the vehicle 10. The front facing imaging device 28 captures images forward of the motor vehicle 10 and may capture images of another vehicle that may be used to capture and identify a cargo load on the other vehicle and approximate a center of gravity of the cargo load on the other vehicle, according to one example.

Figure 2:
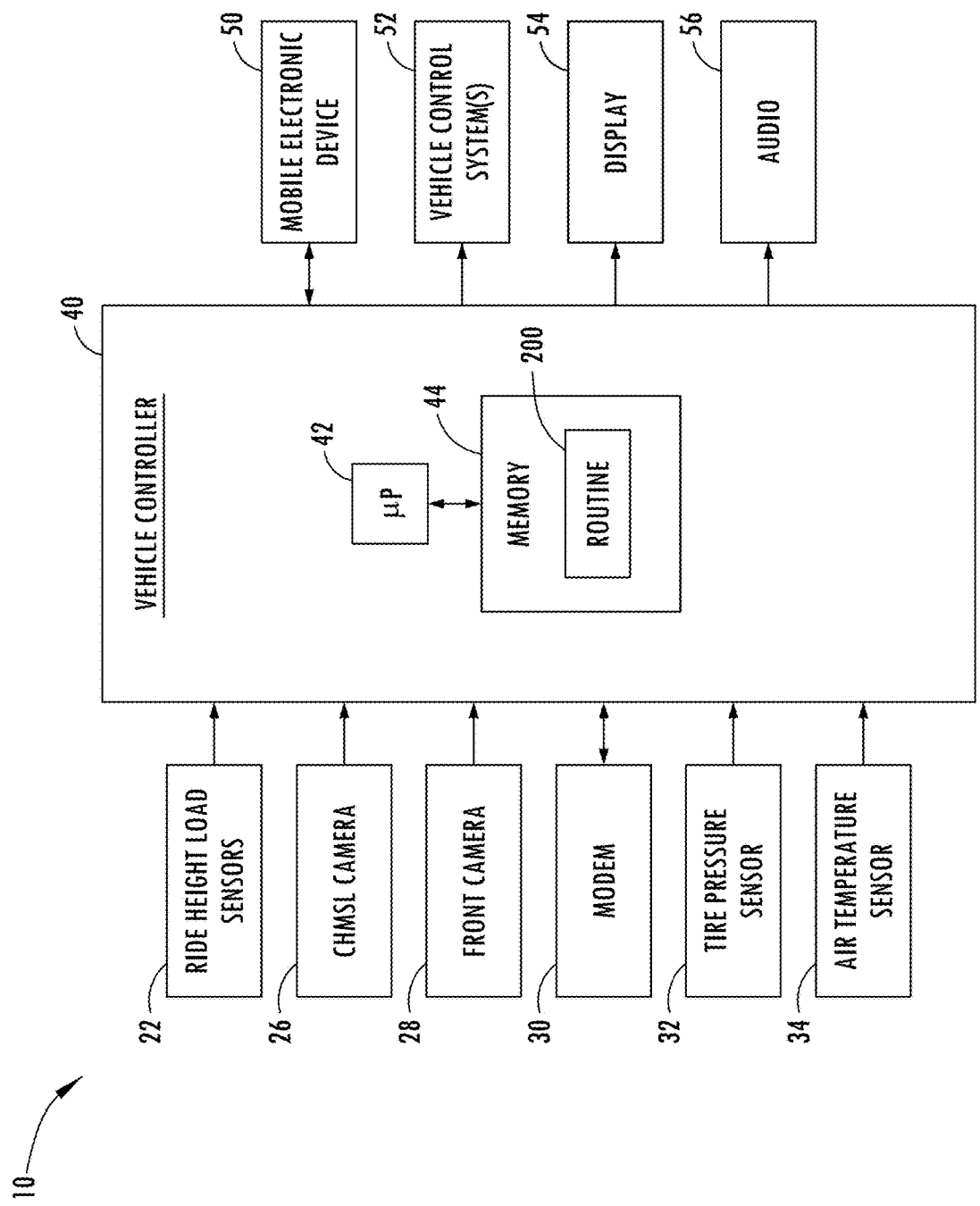
FIG. 2 is a flow diagram further illustrating the load detection system having a controller for estimating the center of gravity of the load.

Referring to FIG. 2, the motor vehicle 10 is shown having a vehicle controller 40. The vehicle controller 40 processes various input signals including sensed vehicle load signals from the load sensors and images captured with the cameras and determines the load distribution of the vehicle, an estimated size and distribution of the cargo load and an estimated center of gravity of the cargo load based on known shapes of one or more objects in the cargo area, and may generate various outputs including an output signal and/or one or more control signals. The vehicle controller 40 may include a shared or dedicated controller having a microprocessor 42 and memory 44, according to one example. It should be appreciated that the vehicle controller 40 may include other analog and/or digital control circuitry.

The vehicle controller 40 receives various inputs including input signals from the ride height load sensors 22. The load sensor generated signals indicate the sensed load distribution of the motor vehicle. In addition, the vehicle controller 40 receives captured images from the rearward facing CHMLS camera imaging device 26 and the front facing camera imaging device 28. The captured images from each of camera imaging devices 26 and 28 may be processed by image processing performed by the vehicle controller 40. The vehicle controller 40 further communicates with a modem 30 which may provide vehicle-to-vehicle communication. In addition, a tire pressure sensor 32 provides a tire pressure signal and an air temperature sensor 34 provides an air temperature signal to the vehicle controller 40.

The vehicle controller 40 includes one or more routines 200 stored in memory 44 and executed by the microprocessor 42. The routines 200 may process the various signals provided as inputs to the vehicle controller 40 and generates outputs. For example, the vehicle controller 200 may estimate the size and distribution of the cargo load and estimate the center of gravity of the cargo load based on known shapes and sizes of one or more of the objects located in the cargo area and generate one or more output signals and/or control signals based on the estimated cargo loading. The output signals may be provided to various outputs that may include a display 54 and an audio output 56. The vehicle controller 40 may also generate as outputs one or more parameters to supply to one or more vehicle control systems. It should further be appreciated that one or more mobile electronic devices 50 may communicate with the vehicle controller. This may include communicating with a mobile electronic device, such as a phone, iPad® or other electronic device. For example, an electronic device may be deployed to capture images and provide communication from one vehicle to another to indicate the detected estimated load on the other vehicle.

Figure 3:
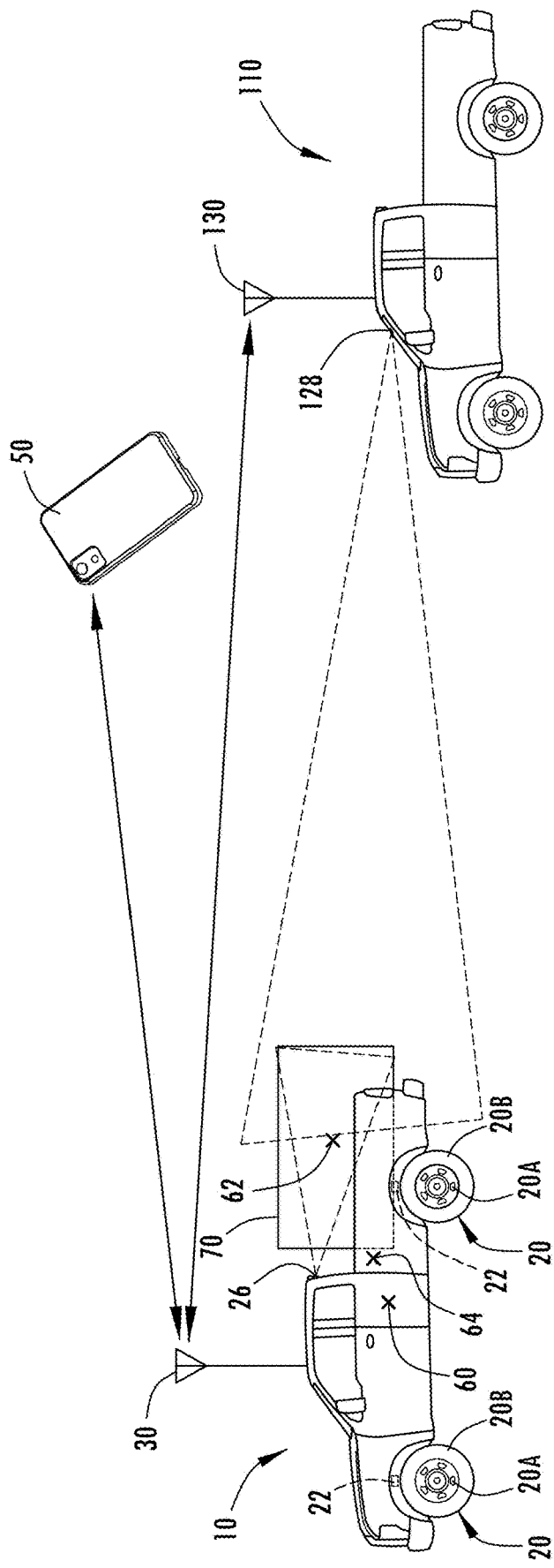
FIG. 3 is a schematic side view of the motor vehicle equipped with a light, large object in the cargo bed of the motor vehicle, according to a first scenario.

Referring to FIG. 3, the motor vehicle 10 is shown in a first scenario having a relatively lightweight but large dimensioned cargo load object loaded on the cargo area of the motor vehicle 10. The cargo load object 70 is generally shown as a rectangular configured object, according to one example. In addition, another motor vehicle 110 having a forward-facing imaging device 128 is illustrated located behind motor vehicle 10. The other motor vehicle 110 may use the forward-facing imaging device 128 to capture images from the rear or side of the motor vehicle 10 which may be used to detect one or more cargo objects in the cargo area of motor vehicle 10 and use the images to estimate the center of gravity of the one or more cargo objects. The images and the detected center of gravity of the one or more cargo object may then be communicated via a modem/antenna 130 to the motor vehicle 10 via another modem/antenna 30. The communication may include the use of an electronic device, such as a phone, for example. In this scenario, it should be appreciated that the rearward facing CHMSL camera imaging device 26 may be blocked from view from completely capturing images of the large item 70. As such, the other motor vehicle 110 may be used to assist with capturing images to acquire the shape and size of the object 70. It should be appreciated that imaging of objects in the cargo area may be acquired by other cameras such as a camera or Lidar on a phone or an iPad®, for example.

In this scenario, the center of gravity of the cargo load may be estimated and an output generated and used to provide one or more outputs to the driver. The cargo load dimensions may be detected by processing the cargo images. The weight load and distribution may be estimated by comparing the sensed load distribution of the vehicle without the cargo load to the sensed load distribution of the vehicle with the cargo load included on the vehicle. As such, the light weight but large dimensional cargo object may be determined.

Figure 4:
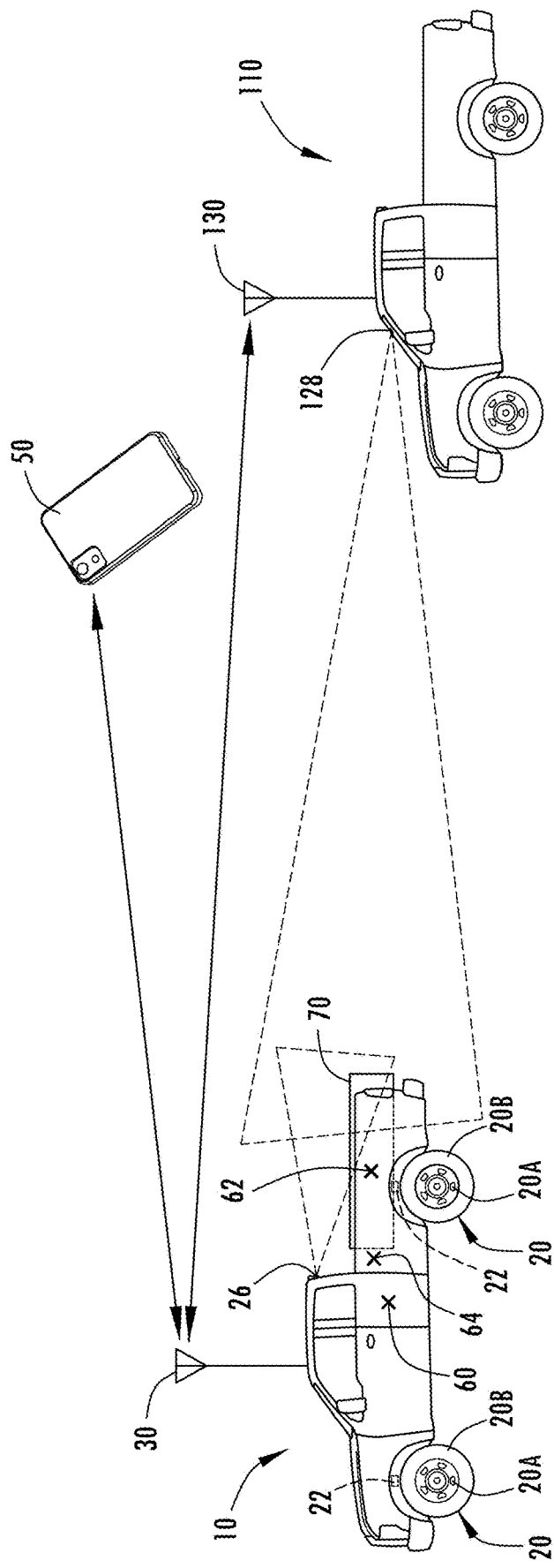
FIG. 4 is a schematic side view of the motor vehicle equipped with a heavy, small object in the cargo bed of the motor vehicle, according to a second scenario.

Referring to FIG. 4, a second scenario of the motor vehicle 10 is illustrated carrying a relatively heavy, but small object 70 in the rear cargo area, according to another example. In this scenario, the ride height load sensors may detect the load of the vehicle both with and without the cargo load. In addition, the rearward facing CHMSL imaging device 26 may capture at least some images of the object 70 in the cargo area of the motor vehicle 10. The other vehicle 110 may further employ the forward oriented camera 128 to capture images of the cargo load object 70 and may communicate the images and estimation data via the modem/antenna 130 with the vehicle modem/antenna 30 to the motor vehicle 10. The center of gravity of the cargo load may be estimated based on the assumption that the weight of the object is substantially evenly distributed within the object's dimension/shape. The controller may generate an output and may provide the driver with one or more outputs.

In this scenario, the captured images are processed to determine the dimensions of the cargo load. The ride height load sensor signals are processed to determine the load of the vehicle before the cargo load is applied and the load of the vehicle with the cargo load applied to estimate the load of the cargo load as the difference in measurements. As such, the heavy and small cargo load may be determined. The estimated center of gravity of the cargo load may be determined and used to determine the vehicle center of gravity.

Figure 5:
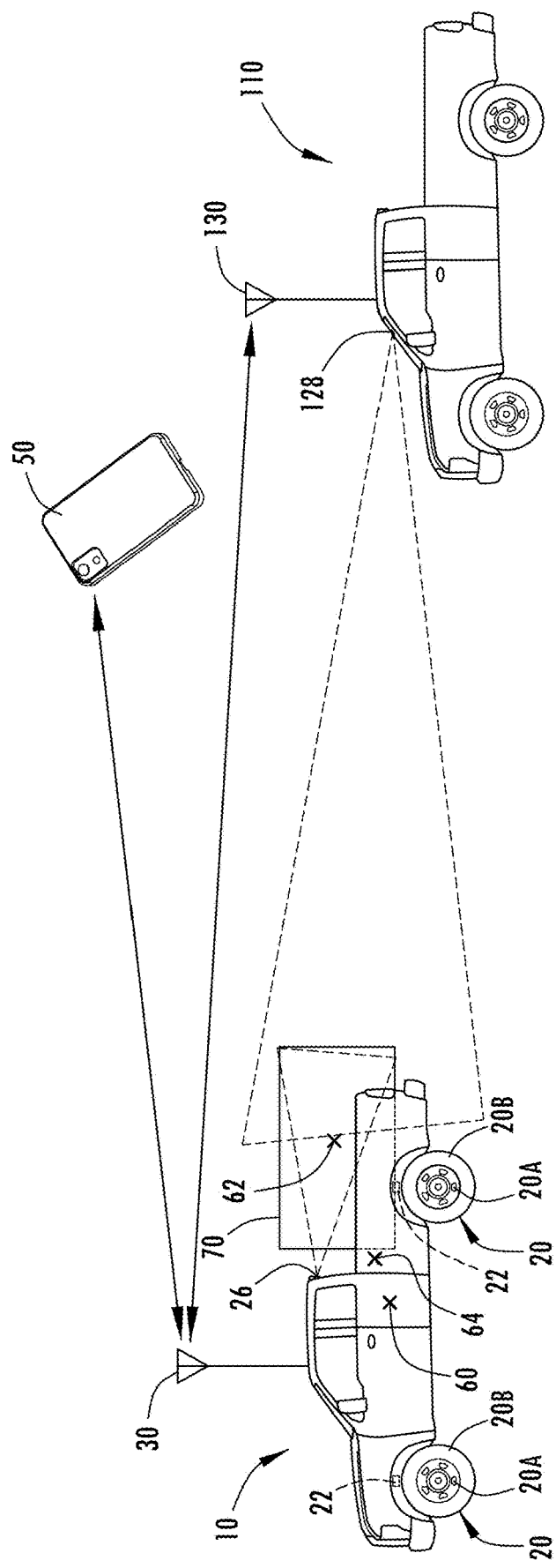
FIG. 5 is a schematic side view of the motor vehicle equipped with a heavy, large object in the cargo bed of the motor vehicle, according to a third scenario.

Referring to FIG. 5, a third scenario of the motor vehicle 10 is illustrated having a relatively heavy weighted and large dimensioned object transported in the cargo area, according to a further example. In this scenario, the rearward facing CHMSL imaging device 26 may capture at least a portion of the cargo load object 70, while the following vehicle 110 may capture the cargo load object 70 with the forward-facing camera 128. The other vehicle 110 may communicate the images and/or estimation of the center of gravity of the cargo load with the modem/antenna 130 with the modem/antenna 30 on the motor vehicle 10. In this scenario, the controller may calculate an approximate center of gravity of the cargo load based on the assumption that the weight is evenly distributed within the object's dimension/weight. The controller may generate an output indicative of the estimated center of gravity of the cargo load.

In this scenario, the captured images are processed to determine the dimensions of the cargo load. The ride height load sensor signals are processed to determine the load of the vehicle before the cargo load is applied and the load of the vehicle with the cargo load applied to estimate the load of the cargo load as the difference in measurements. As such, the heavy and large dimension cargo load may be determined. The estimated center of gravity of the cargo load may be determined and used to determine the vehicle center of gravity.

Figure 6:
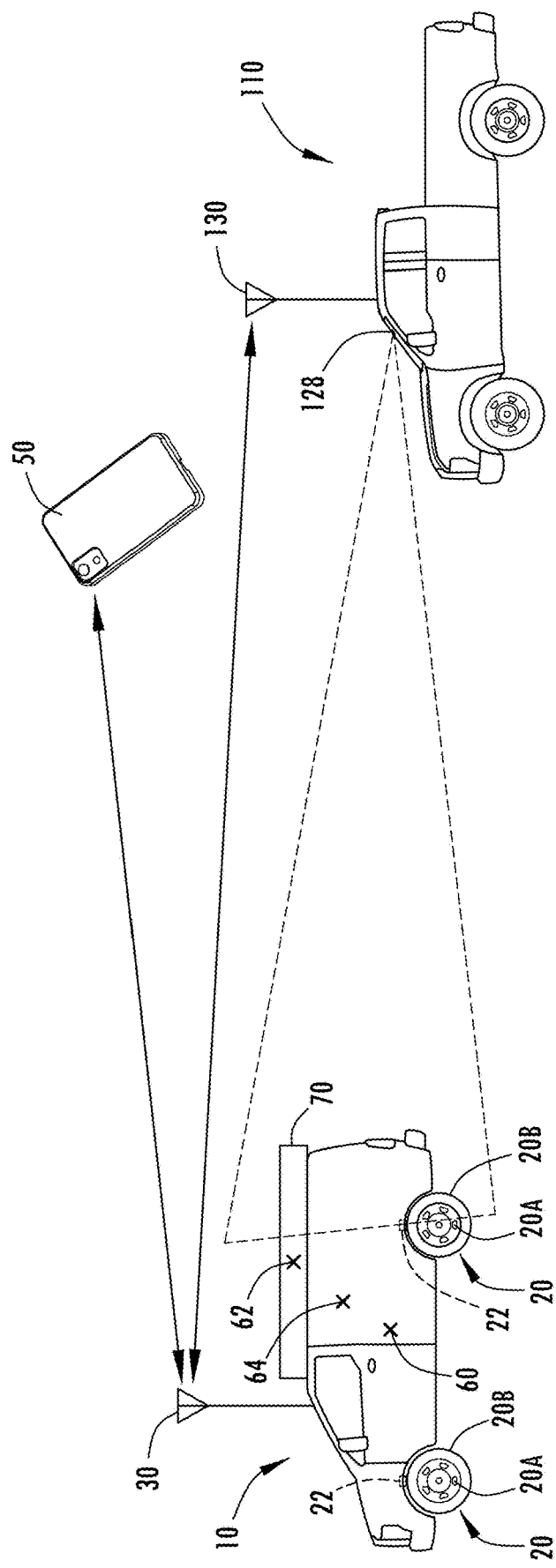
FIG. 6 is a schematic side view of a motor vehicle equipped with a cargo load on the roof, according to a fourth scenario.

Referring to FIG. 6, in a fourth scenario, the motor vehicle 10 is illustrated as a van, according to another example, having an oversized or a large roof cargo load 70 located on the roof of the motor vehicle 10. In this scenario, it may be difficult for an imaging device onboard the motor vehicle 10 to capture images of the cargo load 70 on the roof. In this situation, the following other vehicle 110 may employ the forward-looking imaging device 128 to capture images of the cargo load 70 on top of the roof of the motor vehicle 10 and communicates the images and/or estimates of center of gravity of the modem/antenna 130 with the modem/antenna 30 of the motor vehicle 10. In this scenario, the controller may estimate a center of gravity of the cargo load based on assumption that the weight of the cargo load is evenly distributed within the object's dimension/shape. The controller may generate an output indicative of the estimated center of gravity of the cargo load.

In this scenario, the captured images are processed to determine the dimensions of the cargo load. The ride height load sensor signals are processed to determine the load of the vehicle before the cargo load is applied and the load of the vehicle with the cargo load applied to estimate the load of the cargo load as the difference in measurements. As such, the roof top cargo load center of gravity may be determined. The estimated center of gravity of the cargo load may be determined and used to determine the vehicle center of gravity.

In each of the various scenarios shown and described herein, the object recognition system has an imaging device, such as a camera, located onboard the motor vehicle 10 or another vehicle 110 may be employed to capture images of the cargo load on the motor vehicle 10. The images captured with the camera(s) may be processed by an image processor associated with the controller to determine an estimated size and distribution of the cargo load. This may be achieved by comparing known images of objects to the images captured with the cameras. The weight of the load may be determined by measuring the vehicle load weight with the load sensors with and without the cargo load applied. The estimated center of gravity of the cargo load may then be compared with the vehicle normal unloaded center of gravity to approximate a new loaded vehicle center of gravity. The change in the center of gravity of the motor vehicle 10 may be output to a vehicle control system to adjust at least one or more parameters. The method may measure and estimate the center of gravity of the cargo load by using the parallel-axis theorem for the center of gravity calculations. The parallel-axis theorem may assume that the vehicle is represented by one center of gravity and the cargo load is added as an additional center of gravity. The parallel-axis theorem may be represented by $$I_x = \frac{b(d+2t)^3}{12} - \frac{(b-t_w)d^3}{12},$$

wherein b is a width dimension, d is a height dimension, t is a thickness dimension and $t_w$ is a thickness of the width dimension of the cargo load. The center of gravity of the cargo load may be approximated based on known shapes, such as rectangular area, triangular area, circular area, semi-circular area, quarter-circular area, elliptical area and other known shapes. It should be appreciated that by employing the parallel-axis theorem, the center of gravity of a cargo load may be approximated based on the various known shapes, according to various examples.

Figure 7:
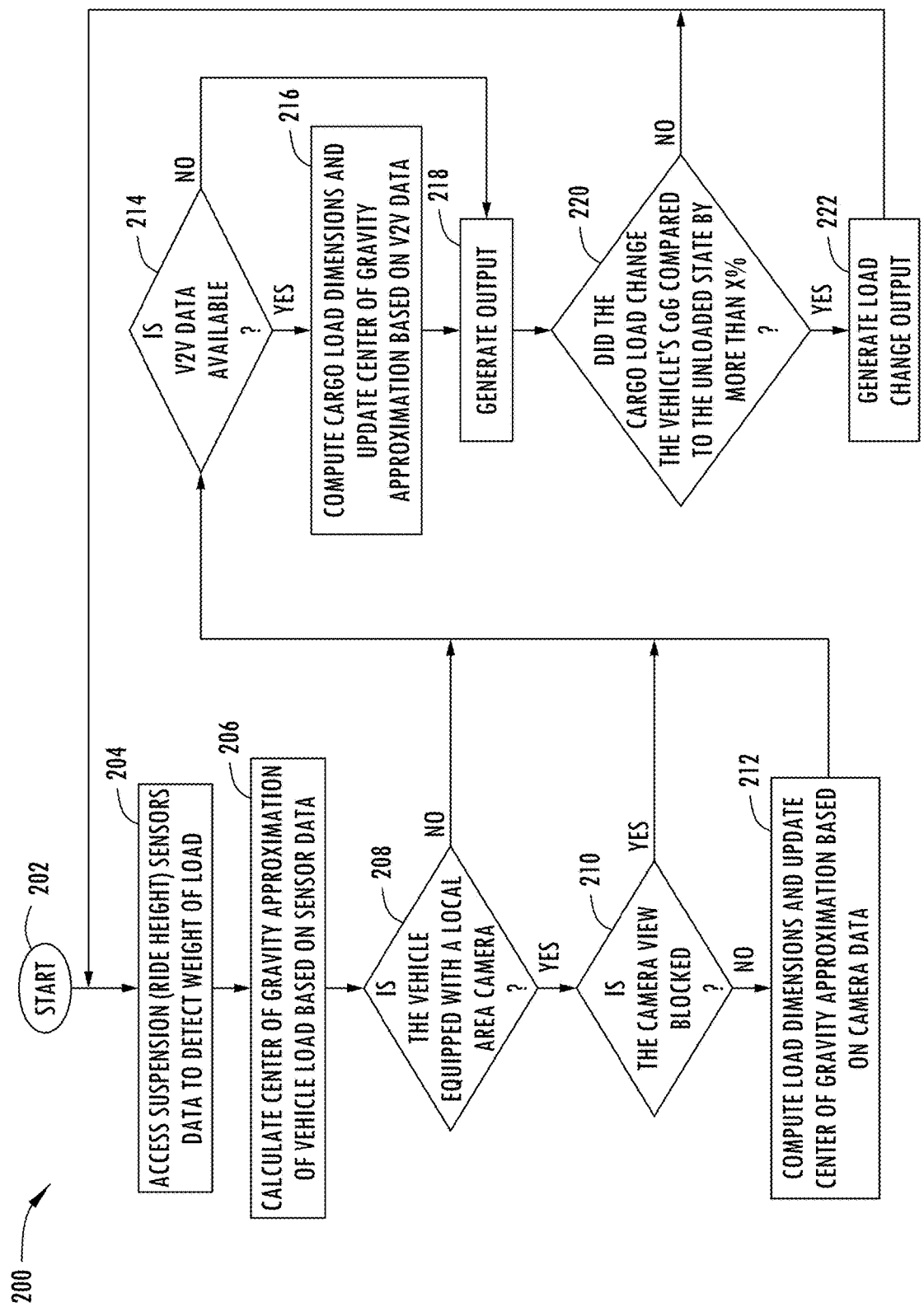
FIG. 7 is a flow diagram illustrating a routine for estimating the load and the center of gravity of the load, according to one example.

Referring to FIG. 7, the routine 200 for approximating the cargo load and vehicle load and providing one or more outputs is provided, according to one embodiment. The routine 200 begins at step 202 and proceeds to step 204 to access the sensed signals from the suspension ride height load sensors to detect the weight of the vehicle load and distribution of the vehicle load. This may include detecting sensed height or weight signals from each of the four ride height load sensors. Next, routine 200 calculates a center of gravity approximation of the vehicle load based on the sensor data at step 206. Routine 200 then proceeds to decision step 208 to determine if the vehicle is equipped with a load area camera, such as the CHMSL camera and, if not, proceeds to decision step 214. If the vehicle is equipped with a load area camera, routine 200 proceeds to step 210 to determine if the load area camera view is blocked and, if so, proceeds to decision step 214. If the load area camera is not blocked, routine 200 computes the load dimensions and updates the center of gravity approximation based on the camera acquired information at step 212, before proceeding to decision step 214.

At decision step 214, routine 200 determines if vehicle-to-vehicle (V2V) communication is available and, if so, proceeds to step 216 to compute the cargo load dimensions and update the center of gravity of approximation based on the vehicle-to-vehicle information. Thereafter, or if vehicle-to-vehicle information is not available, routine 200 proceeds to step 218 to generate an output indicative of the center of gravity estimation. Next, at decision step 220, routine 200 determines if the cargo load changes the vehicle's center of gravity compared to the unloaded state by more than X %. It should be appreciated that the change in X % may be 10%, 15% or 20%, according to various examples depending upon the vehicle configuration. The percentage change in X may be determined based on each of the X, Y and Z coordinates of a rectilinear coordinate system by comparing the change in the center of gravity distance relative to each of the corresponding dimensions of the vehicle. If the vehicle center of gravity does not change by more than X %, routine 200 proceeds to step 222 to generate a load change output before returning to the beginning.

Accordingly, the motor vehicle 10 advantageously detects a cargo load and estimates the size and distribution of the cargo load and estimates the center of gravity of the cargo load on the vehicle. This may enable the motor vehicle 10 to determine a new center of gravity of the vehicle and to generate an output.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a plurality of wheel assemblies;
a body supported on the plurality of wheel assemblies and having a cab and a cargo bed providing a cargo area for receiving a cargo load;
a load sensing system configured to sense a vehicle load and generate vehicle load signals indicative of the sensed vehicle load;
an object recognition system comprising a rearward facing first imaging device located on the cab proximate to a CHMSL which is located forward and above the cargo bed and configured to capture first images of the cargo area and a communication device configured to receive second images of the cargo area captured by a second imaging device located on another motor vehicle having wheel assemblies and located behind the vehicle, wherein the first and second images are used to detect one or more objects in the cargo area and recognize the one or more objects; and
a controller processing the recognized one or more objects and determining dimensions of the cargo load and an estimated center of gravity of the cargo load based on the dimensions of the one or more objects in the cargo area, the controller generating an output indicative of the estimated center of gravity of the cargo load, wherein the controller determines the dimensions of the cargo load and the estimated center of gravity of the cargo load based on the dimensions of the one or more objects detected with the first imaging device and further determines if the first imaging device is blocked and, if so, determines the dimensions of the cargo load and the estimated center of gravity of the cargo load based on the second images captured by the second imaging device.

2. The vehicle of claim 1, wherein the controller estimates the center of gravity of the cargo load using a parallel-axis theorem.

3. The vehicle of claim 1, wherein the controller estimates the center of gravity of the cargo load based on known shapes and sizes of the detected objects in the load area.

4. The vehicle of claim 1, wherein the controller further determines a center of gravity of the vehicle based on the estimated center of gravity of the cargo load.

5. The vehicle of claim 1, wherein the load sensing system comprises a plurality of ride height load sensors.

6. The vehicle of claim 1, wherein the generated images are compared to known images of objects to estimate the cargo load.

7. A vehicle comprising:
a plurality of wheel assemblies;
a body supported on the plurality of wheel assemblies and having a cab and a cargo bed providing a cargo area for receiving a cargo load;
a CHMSL located on the cab forward and above the cargo bed;
a load sensing system configured to sense a vehicle load and generate vehicle load signals indicative of the sensed vehicle load;
an object recognition system comprising a rearward facing first imaging device located proximate to the CHMSL configured to capture first images of the cargo area and a communication device configured to receive second images captured by a second imaging device on another motor vehicle having wheel assemblies and located behind the vehicle, wherein the first and second images are used to detect one or more objects in the cargo area and to recognize the one or more objects; and
a controller processing the recognized one or more objects and determining dimensions of objects in the cargo area, the controller further determining an estimated size and distribution of the cargo load and an estimated center of gravity of the cargo load based on determined dimensions of the objects in the cargo area, wherein the controller estimates the center of gravity of the cargo load using a parallel-axis theorem, the controller generating an output indicative of the estimated center of gravity of the cargo load, wherein the controller determines the dimensions of the cargo load and the estimated center of gravity of the cargo load based on the dimensions of the one or more objects detected with the first imaging device and further determines if the first imaging device is blocked and, if so, determines the dimensions of the cargo load and the estimated center of gravity of the cargo load based on the second images captured by the second imaging device.

8. A method of estimating a center of gravity of a cargo load on a vehicle having a cab and a cargo bed, the method comprising:
sensing a vehicle load of the vehicle and generating vehicle load signals indicative of the sensed vehicle load;

capturing first images of the cargo load in the cargo bed providing a cargo area of the vehicle with a rearward facing first imaging device proximate to a CHMSL located on the cab forward and above the cargo bed;

receiving second images of the cargo bed from a second imaging device located on another motor vehicle having wheel assemblies and a forward facing imaging device and located behind the vehicle;

processing the first and second images to determine estimated dimensions of the cargo load;

estimating a center of gravity of the cargo load based on the estimated dimensions of the cargo load; and generating an output indicative of the estimated center of gravity of the cargo load, wherein the estimated dimensions of the cargo load and the estimated center of gravity of the cargo load are based on dimensions of one or more objects detected with the first imaging device and, if the first imaging device is blocked, the dimensions of the cargo load and the estimated center of gravity of the cargo load are determined based on the second images received from the second imaging device.

9. The method of claim 8, wherein the step of estimating the center of gravity of the cargo load comprises using a parallel-axis theorem.

10. The method of claim 8, wherein the controller further determines a center of gravity of the vehicle based on the estimated center of gravity of the cargo load.

11. The method of claim 8, wherein the step of capturing first images of one or more objects in the cargo area comprises generating the first images of the load in the cargo area with a camera.

12. The method of claim 11, wherein the step of estimating dimensions of the cargo load comprises comparing the first and second images of the cargo area to known images of objects.

13. The method of claim 8 further comprising the step of displaying the output.

* * * * *